United States Patent
Fu et al.

(10) Patent No.: US 8,675,334 B2
(45) Date of Patent: Mar. 18, 2014

(54) METHOD FOR OPERATING A TANK DEVICE ESPECIALLY OF A MOTOR VEHICLE

(75) Inventors: Chengxuan Fu, Untergruppenbach (DE); Isabelle Gentil-Kreienkamp, Grossbottwar (DE)

(73) Assignee: Robert Bosch GmbH, Stuttgart (DE)

( * ) Notice: Subject to any disclaimer, the term of this patent is extended or adjusted under 35 U.S.C. 154(b) by 669 days.

(21) Appl. No.: 12/927,251

(22) Filed: Nov. 9, 2010

(65) Prior Publication Data

US 2011/0114188 A1 May 19, 2011

(30) Foreign Application Priority Data

Nov. 18, 2009 (DE) .......................... 10 2009 046 836

(51) Int. Cl.
*F17D 3/00* (2006.01)
(52) U.S. Cl.
USPC ............ 361/170; 180/271; 180/277; 180/279

(58) Field of Classification Search
USPC .................. 361/170; 180/282–284, 277, 279; 701/104
See application file for complete search history.

(56) References Cited

U.S. PATENT DOCUMENTS

| | | | | |
|---|---|---|---|---|
| 5,880,568 A | * | 3/1999 | Bederna et al. | 318/563 |
| 6,230,094 B1 | * | 5/2001 | Ohashi et al. | 701/107 |
| 6,236,919 B1 | * | 5/2001 | Corbin et al. | 701/36 |
| 7,612,464 B2 | * | 11/2009 | Yano | 307/10.1 |
| 2005/0184495 A1 | * | 8/2005 | Zerbe | 280/735 |

* cited by examiner

*Primary Examiner* — Jared Fureman
*Assistant Examiner* — Kevin J Comber
(74) *Attorney, Agent, or Firm* — Kenyon & Kenyon LLP

(57) ABSTRACT

In a method for operating a tank device of a motor vehicle having a tank and a valve which is adjustable by a driver stage connected to an energy supply, the valve is closed in response to an ascertained fault. Based on the fault, two output signals are formed for closing the valve: one of the output signals represents a relay signal and interrupts the energy supply to the driver stage.

24 Claims, 2 Drawing Sheets

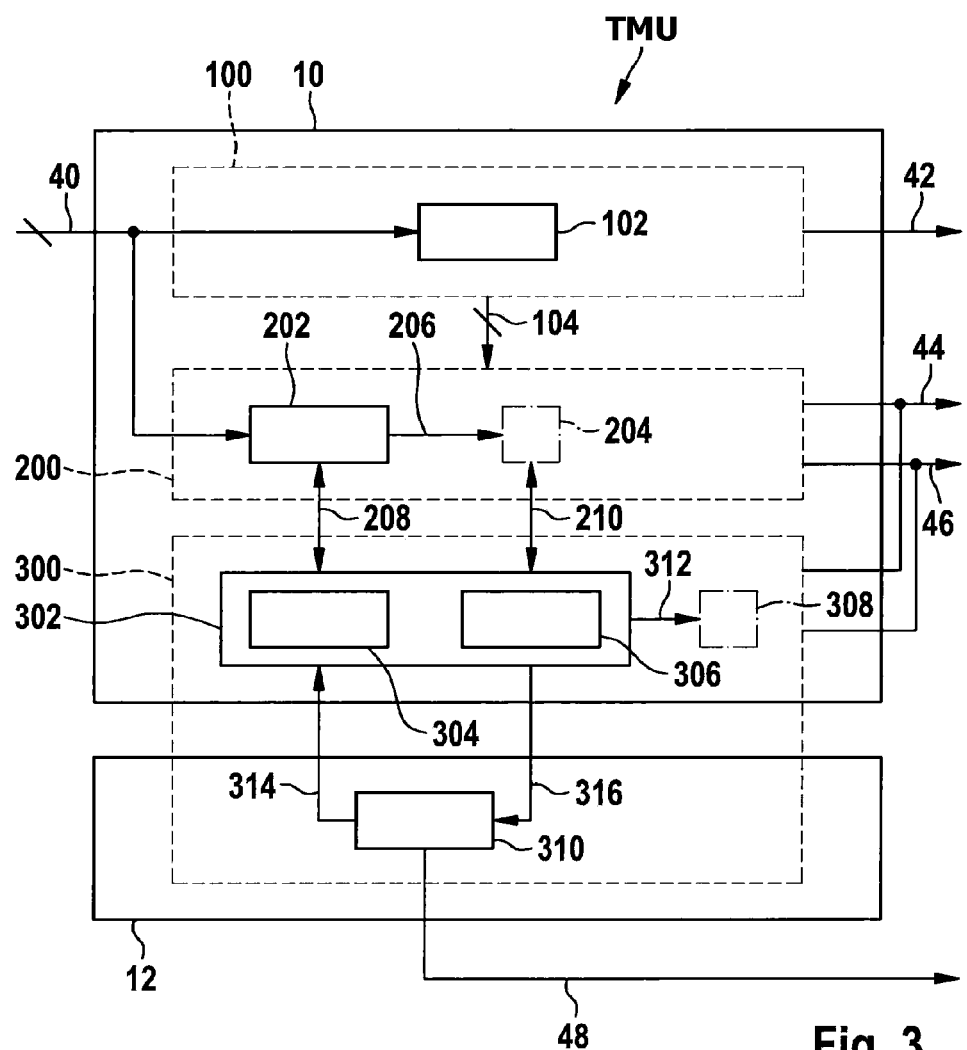
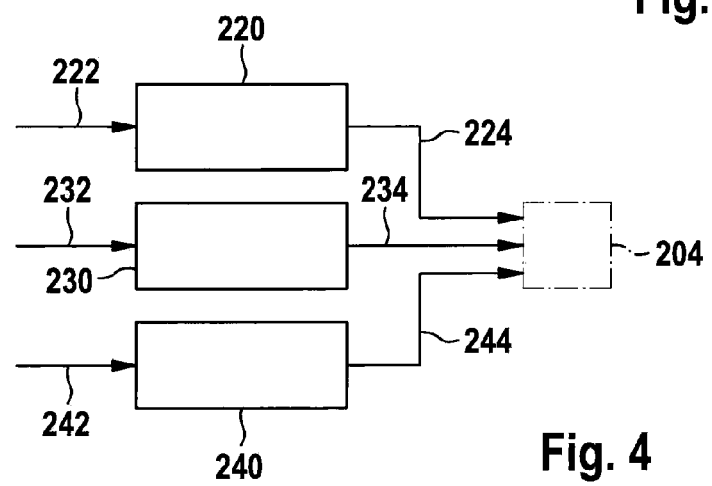
Fig. 3
Fig. 4

METHOD FOR OPERATING A TANK DEVICE ESPECIALLY OF A MOTOR VEHICLE

BACKGROUND OF THE INVENTION

1. Field of the Invention

The present invention relates to a method for operating a tank device, e.g., a fuel tank in a motor vehicle.

2. Description of the Related Art

Motor vehicles are known which are equipped with high-pressure tanks for taking on fuel. Natural gas-operated vehicles and fuel cell vehicles are examples of this.

In fuel cell vehicles, hydrogen is usually carried along in a high-pressure tank, in order to obtain electrical energy from the reaction of hydrogen and oxygen fed in, and to drive the fuel cell vehicle using an electric motor.

It is equally well known that hydrogen and oxygen cause an explosion, the so-called oxyhydrogen gas reaction, when mixed and ignited. It is also known that substances carried along, such as hydrogen, must not escape from the tank in certain situations, such as during a traffic accident, in order not to endanger safety.

BRIEF SUMMARY OF THE INVENTION

The tank device according to the present invention has at least one tank and at least one valve, the valve being adjustable using a driver stage connected to an energy supply. Furthermore, if a fault is ascertained, the valve is closed, according to the present invention. Because of the fault, two output signals are formed to close the valve, one of the output signals representing a relay signal and interrupting the energy supply to the driver stage. The energy supply to the driver stage is switched on or off by the relay signal. The purpose of the method is always to operate the tank in a safe state. If a fault occurs that relates to the safety of the tank, the valve is closed to avoid the escape of highly ignitable hydrogen, for example.

In one advantageous example embodiment of the method, a functional signal is generated by the tank monitoring unit. The opening width of the valve is influenced by the functional signal, using a driver stage. If the driver stage is supplied with energy by the supply relay, and thus by the relay signal, the opening width of the valve is able to be controlled and/or regulated by the functional signal. The valve can be closed in response to the occurrence of a fault state. If, on the other hand, the energy supply is interrupted by the supply relay, and thus by the relay signal based on the determined fault, the valve also closes. Consequently, the signals for closing the valve are designed redundantly, which is equivalent to an increase in safety of the tank device.

In a further, advantageous example embodiment of the method, the formation of the functional signal and the relay signal takes place in largely separate and thus parallel running planes on a functional calculator. The functional signal is formed by a functional plane, and the relay signal is formed by a functional monitoring plane. Because of that, not only the signals, but also the ascertainment of the signals, are designed redundantly. This also increases safety of the tank device, since an occurring fault is intercepted in such a way that the safety of the motor vehicle is assured.

In one particularly advantageous example embodiment of the method, the data input of the functional monitoring plane takes place using increased values in comparison to the functional plane. Examples for this are threshold values and debouncing times. This ensures that the functional plane is able to react to a fault case before a monitoring function initiates a fault reaction from the functional monitoring plane.

In one particularly advantageous example embodiment of the method, a watchdog unit is present besides the functional calculator. The watchdog unit monitors the functional calculator with respect to the hardware, for instance by memory tests, and with respect to correct functional sequences, for instance, of the fault reaction. If the watchdog unit establishes a fault, a switch is operated, using a validating signal, which interrupts all the output signals of the functional calculator. Consequently, in the fault case, the watchdog unit also closes the valve, and thus represents an additional, redundant switching off due to a fault.

BRIEF DESCRIPTION OF THE DRAWINGS

FIG. 3 shows a more detailed schematic block diagram of the tank monitoring unit.

FIG. 4 shows a schematic block diagram of a functional monitoring plane of the tank monitoring unit.

DETAILED DESCRIPTION OF THE INVENTION

Figure 1:
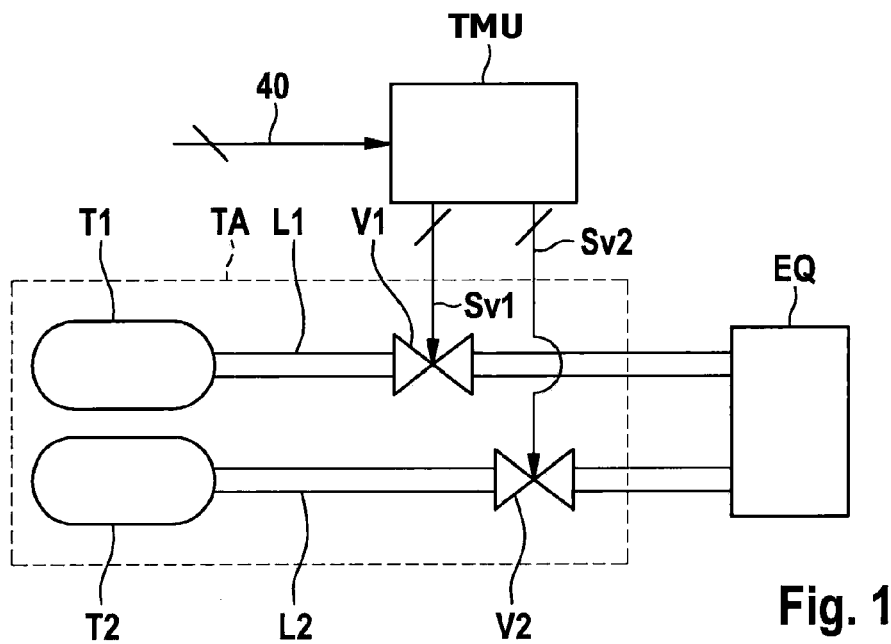
FIG. 1 shows a schematic block diagram of a tank device, especially of a motor vehicle, having a tank monitoring unit.

Tank monitoring unit TMU in FIG. 1 has input signals 40 applied to it. Tank monitoring unit TMU forms control signals Sv1 and Sv2. Control signals Sv1 are applied to a valve V1. Control signals Sv2 are applied to a valve V2. Valve V1 influences the flow through a line L1. Line L1 connects a tank T1 to a device EQ. Valve V2 influences the flow through a line L2. Line L2 connects a tank T2 to the device EQ. Tanks T1, T2 along with associated valves V1, V2, form a tank device TA for device EQ.

Based on input signals 40 as well as internal sequences using the setting and/or regulation of valves V1 and V2 via control signals Sv1 and Sv2, tank monitoring unit TMU influences the supply of device EQ with substances from tanks T1 and T2. It is the task of tank monitoring unit TMU, on the one hand, to carry out the control and/or the regulation of valves V1 and/or V2, and on the other hand, to ensure the safety of tanks T1 and T2.

Figure 2:
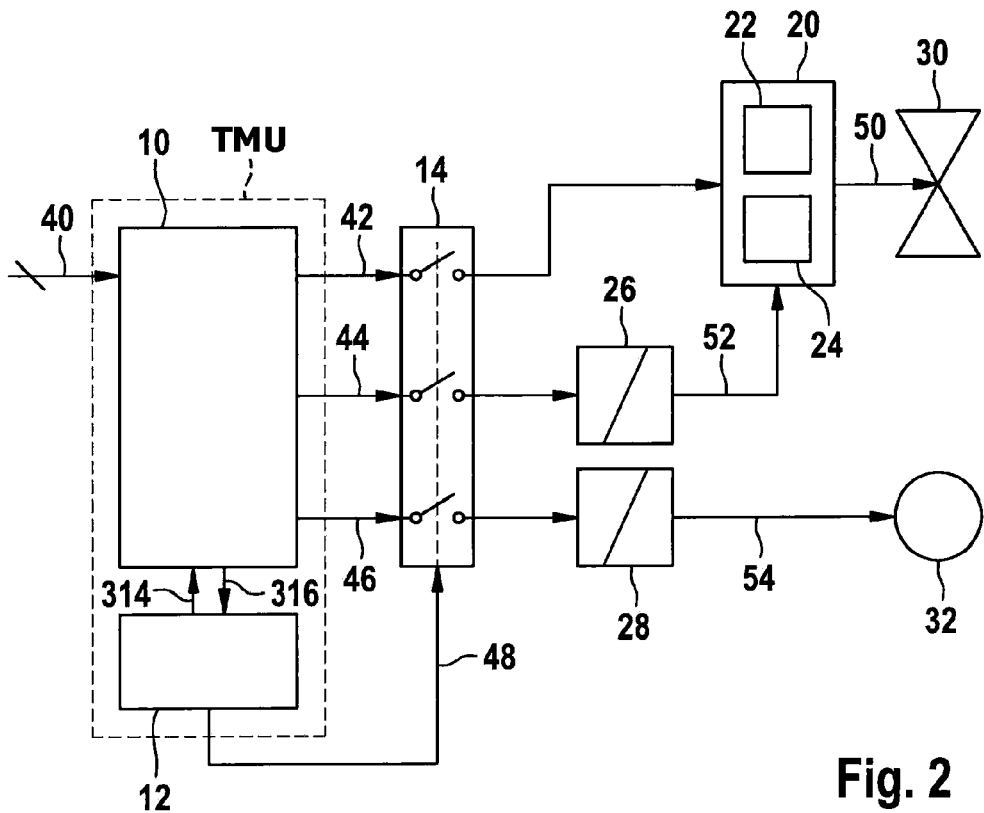
FIG. 2 shows a schematic block diagram of a control of a valve and of a sensor by the tank monitoring unit.

FIG. 2 shows the control of a valve 30 and a sensor 32 by tank monitoring unit TMU. Valve 30 is usually executed as a current-switched valve. Tank monitoring unit TMU is divided into two physically separate units: a functional calculator 10 and a watchdog unit 12. Watchdog unit 12 monitors functional calculator 10 in the form of a question-answer communication that is still to be explained, represented by question 314 and answer 316. Functional calculator 10 has signals 40 applied to it.

A functional signal 42, a relay signal 44 and an output signal 46 are generated by functional calculator 10. Watchdog unit 12 generates a validating signal 48, which is fed to a multipole closing switch 14. Signals 42, 44 and 46 of functional calculator 10 are routed by multipole closing switch 14 exclusively when watchdog unit 12 permits this, using validating signal 48. If watchdog unit 12 determines a fault with respect to functional calculator 10, it is arranged via validating signal 48 that signals 42, 44 and 46 are not relayed.

In response to the successful routing by closing switch 14, functional signal 42 acts on a driver stage 20. Driver stage 20 is developed to increase operating safety, in such a way that a connected load is able to be actuated by high-side driver 22 or a low-side driver 24. This makes it possible to continue actuating the load, using at least the other driver, when one of the two drivers fails.

Signal 50 acts on valve 30 and is formed by driver stage 20. Valve 30 is closed in its unenergized state. Signal 50 determines the opening width of valve 30. With that, functional signal 42 also indirectly determines the opening width of valve 30 via driver stage 20. Functional signal 42 is developed as a pulse width-modulated signal.

Relay signal 44 is developed as a digital signal, and upon successful routing through closing switch 14, it acts upon a supply relay 26 of valve 30. Supply relay 26 supplies driver stage 20 with energy. By relay signal 44, the energy supply of driver stage 20 may be switched on or off using supply relay 26.

Output signal 46 is also developed as a digital signal, and is routed to a supply relay 28 of sensor 32 upon successful routing by closing switch 14. Supply relay 28 supplies sensor 32 with energy via line 54. By output signal 46, the energy supply of sensor 32 may be switched on or off using supply relay 28.

If closing switch 14 is closed, that is, if signals 42, 44 and 46 are relayed, driver stage 20 is supplied with energy, the opening width of valve 30 is influenced using functional signal 42, and sensor 32 is supplied with current. On the other hand, if driver stage 20 is not supplied with energy, this leads to valve 30 being closed.

By contrast, if closing switch 14 is opened by watchdog unit 12, signals 42, 44 and 46 are no longer relayed. Consequently, an open closing switch has the effect that driver stage 20 and sensor 32 are no longer being supplied with energy. Driver stage 20 that is no longer supplied with energy, and also interrupted functional signal 42 result in valve 30 closing.

Compared to FIG. 1, functional signal 42, relay signal 44 and validating signal 48 should jointly be regarded as control signals Sv1 or Sv2. Also, valve 30 of FIG. 2 should be regarded as one of valves V1 or V2 of FIG. 1.

FIG. 3 shows the construction of tank monitoring unit TMU. Functional calculator 10 and watchdog unit 12 are shown. Functional calculator 10 and watchdog unit 12 are subdivided in their functionalities into three planes: a first functional plane 100, a second functional monitoring plane 200 and a third calculator monitoring plane 300.

Functional plane 100 is used to form functional signal 42 for influencing the opening width of valve 30 in FIG. 2. For this, a block 102 is inserted, which has input signals 40 acting on it. Furthermore, in functional plane 100, the monitoring and the diagnosis are carried out by units of the tank device or additional devices. Functional signal 42 is correspondingly influenced.

Input signals 40 are submitted to a plausibility control before the processing of input signals 40 in one of planes 100 or 200. The plausibility control is used to detect certain combinations, sequences, value ranges and curves of input signals 40 as being faulty.

A block 202 of functional monitoring plane 200 also has input signals 40 acting on it. Functional monitoring plane 200 is used to detect faulty sequences and results in functional plane 100. To do this, functions of functional plane 100 are simulated perhaps in simplified form in functional monitoring plane 200. Moreover, a comparison to signals 104 from functional plane 100 is made in functional monitoring plane 200. If a fault is detected in functional plane 100 by block 202, block 202 triggers a fault reaction 204, using signal 206.

Calculator monitoring plane 300 extends from functional calculator 10 to watchdog unit 12. Watchdog unit 12 has a watchdog block 310, which carries out the question-answer communication with a test block 302 of functional calculator 10. Test block 302 is made up of a test block 304 for tests that are calculator-specific, and a test block 306 for tests that are function-specific. The calculator-specific tests include tests of the work memory and the like, for example. The function-specific tests relate to the program sequence and the fault reactions in functional monitoring plane 200. In the fault case, test block 302 triggers a fault reaction 308 using a signal 312.

Watchdog block 310 puts a question 314 to test block 302. Test block 302 carries out calculator-specific and function-specific tests using test blocks 304 and 306. For this purpose, test block 302 is connected to block 202, using a communication path 208, as well as to fault reaction 204 using a communication path 210.

Test block 302 ascertains reply 316 to question 314 that was posed, the results from test blocks 304 and 306 being used. Watchdog block 310 knows the correct answer to question 314 sent out. If answer 316, transmitted by test block 302, corresponds to the expected correct answer, the function of tank monitoring unit TMU is considered to be fault-free. On the other hand, if answer 316 transmitted by test block 302 does not correspond to the expected correct answer, the function of tank monitoring unit TMU is considered to be fault-encumbered. In the last-named fault case, watchdog unit 12 or watchdog block 310 emits validating signal 48, in order to convey the controlled or regulated system, in this case the tank device, into a safe state.

Relay signal 44 and output signal 46 may each be formed in functional monitoring plane 200 or calculator-monitoring plane 300. Relay signal 44 and output signal 46 are able to be formed, for instance, by fault reactions 204 and/or 308.

FIG. 4 shows a detailed specific embodiment of function-monitoring plane 200. A block 220 is used for hydrogen monitoring. Block 220 is acted upon by a hydrogen concentration signal 222. Block 220 carries out a comparison of hydrogen concentration signal 222 to a hydrogen concentration threshold value, and if the hydrogen concentration threshold value is exceeded, it brings about fault reaction 204 via a signal 224.

Block 230 is used for rollover monitoring. Signal 232 indicates a rollover of the motor vehicle. Correspondingly, block 230 brings about fault reaction 204, using a signal 234.

A pressure signal 242 acts on a block 240, which determines, with the aid of pressure signal 242, whether valve 30 of FIG. 2 is closed. In this instance, a comparison takes place using results from functional plane 100. If valve 30 is not closed, fault reaction 204 is triggered using a signal 244.

The methods described are usually developed as computer programs that are run on a control unit. The control unit is usually a microcontroller and is programmed corresponding to the methods described. Moreover, such a computer program is stored on a storage medium.

What is claimed is:

1. A method for operating a tank device of a motor vehicle, the tank device including a tank and a valve configured to be adjustable using a driver stage connected to an energy supply, the method comprising:
   ascertaining a fault related to the tank device; and
   closing the valve in response to the ascertained fault;
   wherein two output signals, each configured to close the valve independently of the other, are formed in response to the ascertained fault, and wherein one of the output signals is a relay signal interrupting the energy supply to the driver stage.

2. The method as recited in claim 1, wherein the driver stage is controlled by a functional signal influencing an opening width of the valve, the functional signal being different from the two output signals for closing the valve in response to an ascertained fault.

3. The method as recited in claim 2, wherein the other one of the output signals formed in response to the ascertained fault is a validating signal interrupting the actuation of the driver stage.

4. The method as recited in claim 3, wherein the functional signal and the relay signal are formed by a functional calculator.

5. The method as recited in claim 4, wherein the validating signal is formed by a watchdog unit, wherein the watchdog unit is physically separate from the functional calculator.

6. The method as recited in claim 5, wherein the functional signal is formed in a functional plane of the functional calculator.

7. The method as recited in claim 6, wherein the relay signal is formed in a functional monitoring plane of the functional calculator.

8. The method as recited in claim 7, wherein the formation of the functional signal and the formation of the relay signal take place independently of each other.

9. The method as recited in claim 7, wherein the functions of the functional plane are simulated in the functional monitoring plane.

10. The method as recited in claim 7, wherein a first debouncing time and a first threshold value are specified for the functional plane, and wherein a second debouncing time greater than the first debouncing time and a second threshold value greater than the first threshold value are specified for the functional monitoring plane.

11. The method as recited in claim 3, wherein the validating signal is formed in a calculator monitoring plane.

12. A non-transitory computer-readable data storage medium storing a computer program having program codes which, when executed on a computer, control a method for operating a tank device of a motor vehicle, the tank device including a tank and a valve configured to be adjustable using a driver stage connected to an energy supply, the method comprising:
    ascertaining a fault related to the tank device; and
    closing the valve in response to the ascertained fault;
    wherein two output signals, each configured to close the valve independently of the other, are formed in response to the ascertained fault, and wherein one of the output signals is a relay signal interrupting the energy supply to the driver stage.

13. The computer-readable data storage medium as recited in claim 12, wherein the driver stage is controlled by a functional signal influencing an opening width of the valve, the functional signal being different from the two output signals for closing the valve in response to an ascertained fault.

14. A control unit for controlling the operation of a tank device of a motor vehicle, the tank device including a tank and a valve configured to be adjustable using a driver stage connected to an energy supply, comprising:
    an ascertaining arrangement to ascertain a fault related to the tank device; and
    a closing arrangement to close the valve in response to the ascertained fault;
    wherein two output signals, each configured to close the valve independently of the other, are formed in response to the ascertained fault, and wherein one of the output signals is a relay signal interrupting the energy supply to the driver stage.

15. The control unit as recited in claim 14, wherein the driver stage is controlled by a functional signal influencing an opening width of the valve, the functional signal being different from the two output signals for closing the valve in response to an ascertained fault.

16. The control unit as recited in claim 15, wherein the other one of the output signals formed in response to the ascertained fault is a validating signal interrupting the actuation of the driver stage.

17. The control unit as recited in claim 16, wherein the functional signal and the relay signal are formed by a functional calculator.

18. The control unit as recited in claim 17, wherein the validating signal is formed by a watchdog unit, wherein the watchdog unit is physically separate from the functional calculator.

19. The control unit as recited in claim 18, wherein the functional signal is formed in a functional plane of the functional calculator.

20. The control unit as recited in claim 19, wherein the relay signal is formed in a functional monitoring plane of the functional calculator.

21. The control unit as recited in claim 20, wherein the formation of the functional signal and the formation of the relay signal take place independently of each other.

22. The control unit as recited in claim 20, wherein the functions of the functional plane are simulated in the functional monitoring plane.

23. The control unit as recited in claim 20, wherein a first debouncing time and a first threshold value are specified for the functional plane, and wherein a second debouncing time greater than the first debouncing time and a second threshold value greater than the first threshold value are specified for the functional monitoring plane.

24. The control unit as recited in claim 16, wherein the validating signal is formed in a calculator monitoring plane.

* * * * *